United States Patent [19]

Fang

[11] 4,099,121
[45] Jul. 4, 1978

[54] SPATIAL DIVERSITY SATELLITE COMMUNICATIONS SYSTEM WITH ERROR CONTROL

[75] Inventor: Russell Ju Fu Fang, Brookeville, Md.

[73] Assignee: Communications Satellite Corporation, Washington, D.C.

[21] Appl. No.: 695,211

[22] Filed: Jun. 11, 1976

[51] Int. Cl.² .................... H03K 13/32; H04B 7/20
[52] U.S. Cl. ................................. 325/4; 325/41; 340/146.1 AG
[58] Field of Search ............. 325/4, 39, 40, 41, 56, 325/301, 304, 305; 340/346.1 R, 346.1 A, 346.1 AG, 346.1 B, 346.1 BE; 360/47; 343/100 ST

[56] References Cited

U.S. PATENT DOCUMENTS

| 3,829,777 | 8/1974 | Muratani et al. ............... 325/4 |
| 3,963,988 | 6/1976 | Niethammer .................. 325/40 |

*Primary Examiner*—Benedict V. Safourek
*Attorney, Agent, or Firm*—Alan J. Kasper; Jay H. Maioli; Leo Millstein

[57] ABSTRACT

A spatial diversity satellite communications system adapted to provide its own error control. The diversity communications system utilizes transmitting station selection or burst switching in the up-link and both probabalistic and algebraic error control in the down link to increase message accuracy and to overcome precipitation attenuation. Specialized multiple level decision demodulators are employed to exploit the inherent redundancy supplied by having available multiple signals embodying identical messages. Information is fedback, once the system is operating, and is used to select the optimum transmitter site. However, all available receivers are utilized and the received messages are statistically evaluated to accurately reproduce the received message.

12 Claims, 7 Drawing Figures

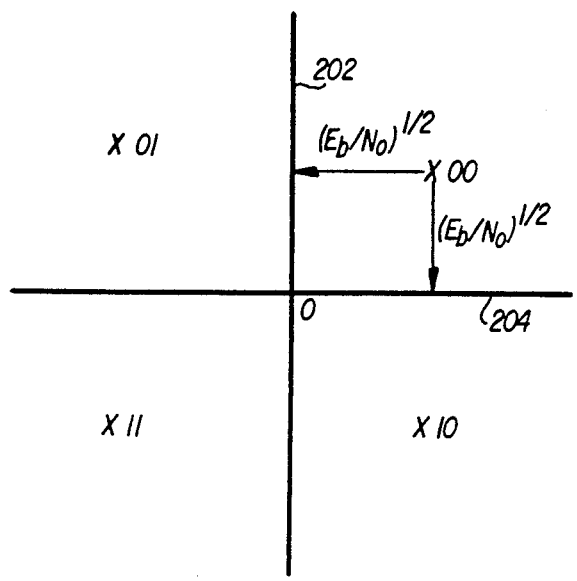
FIG. 3
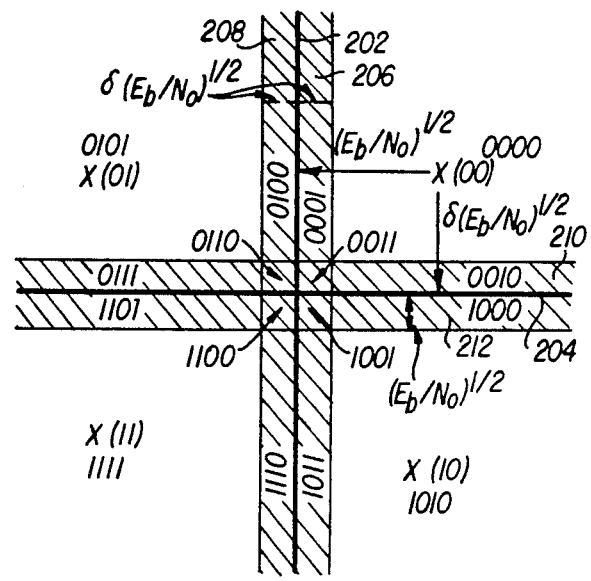
FIG. 4
```
          0000      0010      0101      0111      1010      1000      1111      1101
              0001      0011      0100      0110      1011      1001      1110      1100
0000      0 0 0 0 0 0 0 0 X 0 0 0 0 0 0 X 0 0 0 0 0 0 0 X X 0 0 0 0 0 0
0001      0 0 0 0 0 0 1 0 X 0 1 0 0 1 0 X 0 0 0 0 0 1 1 X X 0 1 0 0
0010      0 0 0 0 0 1 0 0 0 X 0 0 1 0 1 0 X 0 0 0 1 1 1 0 X X 0 0
0011      0 0 0 1 0 1 0 X 1 0 1 0 1 0 X 0 1 1 1 1 1 1 X X
0101                0 1 0 1 0 1 0 1 X X 0 1 0 1 0 1 X 1 0 1 0 1 0 1
0100                0 1 0 1 0 1 1 0 X X 0 0 0 1 1 1 X 1 0 1 0 1
0111                0 1 0 1 1 0 1 1 X X 0 1 1 1 1 1 X 1 0 1
0110                0 1 1 0 1 0 1 0 X X 1 1 1 1 1 1 X 1
1010                              1 0 1 0 1 0 1 0 1 X 1 0 1 0 1 0
1011                              1 0 1 0 1 0 1 1 1 X 1 1 1 0
1000                              1 0 1 0 1 1 1 0 1 X 1 0
1001        THE LOWER TRIANGLE IS     1 0 1 1 1 1 1 1 1 X
            SYMETRICAL TO THE
            UPPER TRIANGLE
1111                                              1 1 1 1 1 1 1 1
1110                                                  1 1 1 1 1 1
1101                                                      1 1 1 1
1100                                                          1 1
```
FIG. 5

SPATIAL DIVERSITY SATELLITE COMMUNICATIONS SYSTEM WITH ERROR CONTROL

BACKGROUND OF THE INVENTION

In order to keep pace with the increasing demand for more and more circuits in satellite communications systems, it has been found desirable for these systems to employ higher carrier frequencies, such as the 11/14 GHz and 20/30 GHz bands. While use of these higher frequency bands has permitted the available bandwidth to be increased, thereby allowing a greater number of channels to be carried, as might be expected, certain disadvantages are also presented when the carrier frequency is raised. One such serious disadvantage is that precipitation acts to greatly attenuate both the received and transmitted signals. Furthermore, it has been found experimentally that this attenuation becomes greater as the carrier frequency increases. It can then be seen that as carrier frequencies are inevitably increased the precipitation attenuation problem will become more acute. One obvious solution to this problem is to increase the signal strength so as to simply overpower the attenuation. This solution is not entirely feasible, however, because in the down-link case a satellite transponder does not have unlimited power available, and in the up-link case there are finite limitations on the size of the transmitter amplifiers. Also, although increasing the power may serve to alleviate the precipitation attentuation problem, error correction may still be necessary. Conversely, error detection/correction standing alone is not always sufficient to provide accurate and reliable communications. A better approach to solving this attenuation problem is to use some form of diversity combined with error control.

The general concept of diversity is well-known in the field of communications and may be simply stated as the technique of transmitting and/or receiving the same message more than once in order to avoid simultaneous fades of the identical message-carrying signals due to propagation anomalies in the communications path. Diversity provides a fail-safe type of system, which may become relatively error free, by relying upon the principle of redundancy. Since the same message will be transmitted more than once, it may then be possible to receive and correlate the messages to determine if an error has occurred. And, of course, the greater the redundancy the greater the probability that the correct message will be received. The systems which have been designed to embody this diversity technique have been many and varied. For example, there is Time Diversity where the same message is transmitted by a single transmitter more than once; there is Frequency Diversity where the same message is transmitted in different frequency bands; and there is Polarization Diversity where the same message is transmitted at different polarization senses. Once the multiple identical messages have been transmitted and received by way of one of the diversity schemes, the signals must be combined or correlated in some manner at the receiver. There are various approaches which also may be taken to achieve this combining function. For example, there is Post-Detection Combining, Pre-Detection Combining, Maximum Ratio Combining and Equal-Gain Combining. Each method of combining also involves an individual approach to error detection and correction which usually is not directly related to the diversity schemes being employed.

SUMMARY OF THE INVENTION

It is therefore an object of the present invention to provide a spatial diversity system for use in satellite communications which incorporates its own error detection and correction system. It is a further object of the present invention to provide a spatial diversity satellite communications system having an integrated error detection and control system which utilizes the inherent redundancy of the diversity system. It is still a further object of the present invention to provide a spatial diversity error control system employing feedback information to select the transmitting station and employing statistical probabilities to optimize the accuracy of the received signal. It is finally an object of the present invention to provide a spatial diversity satellite communications system with internal error control and also employing a multi-decision-level demodulator.

The present invention utilizes all possible performance information sources and all advantages inherent in a redundant system to improve message accuracy. The received signal is monitored for errors and for carrier to noise ratio and this information is used to select the transmitting station experiencing the lowest attenuation. Frame synchronization information, which is routinely fed back, is also used to select the optimum transmitter locale.

An improved demodulator is utilized by the present invention which has six distinct detector levels as opposed to the two normally employed in a four-phase coherent phase shift keyed demodulator. These six levels result in more information being made available concerning each message bit and this additional information is then operated upon statistically to provide a received message which has a high probability of accuracy. The multiple demodulated bit streams are then synchronized bit-by-bit before being decoded. Because more than one signal of the same message has been received and operated upon, the signals are decoded employing predetermined probability rules to further ensure optimum accuracy of the received message.

BRIEF DESCRIPTION OF THE DRAWINGS

FIG. 3 is a plot of the decision regions of the hard decision demodulator used in a conventional four-phase-coherent phase shift keying system.

FIG. 4 is a plot of the decision regions of the soft-decision four-phase coherent phase shift keying demodulator used in a dual diversity system.

FIG. 5 is a table of probablistic decoding rules used in a dual diversity system.

DETAILED DESCRIPTION OF THE PREFERRED EMBODIMENT

Figure 1:
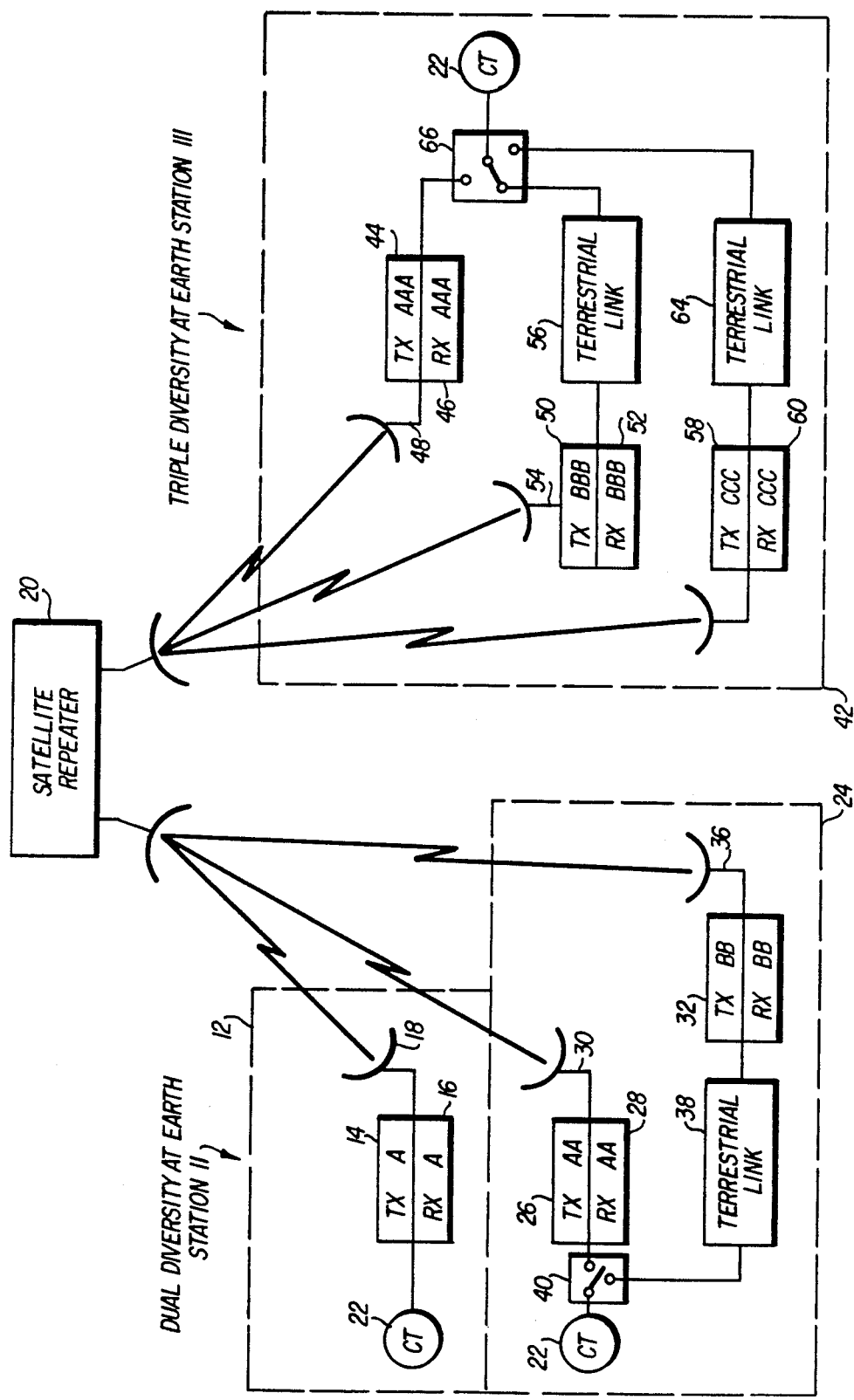
FIG. 1 is a block diagram of a satellite communications system employing dual diversity, triple diversity, and no diversity.

FIG. 1 shows a generalized spatial diversity satellite communications system comprised of three types of earth stations, one employing no diversity, one employing dual diversity, and the other employing triple diversity. A first earth station 12 uses only one transmitter 14, one receiver 16, and only one antenna 18 in combination with the satellite repeater 20. The transit center of the regional telephone switch 22 provides the necessary interface for the earth station. This earth station is of course at the mercy of whatever attenuation is produced by local precipitation conditions. A second earth station 24 is shown which employs dual diversity. A transmitter 26, receiver 28, and antenna 30 communicate with other earth stations by use of the satellite repeater 20 in the conventional manner, and another transmitter 32, receiver 34 and antenna 36, which also utilize the same satellite repeater 20, are located at a distant diversity site. The equipment at the diversity site is connected to the primary site by an appropriate terrestrial link 38 which may consist of cables, microwave links, or the like. The site chosen to transmit the signal to the satellite will depend upon the state of switch 40. The interface is again provided by the transit center of the telephone switch 22. The logic and apparatus which control the actuation of switch 40 will be described below. A third ground station 42 is shown in FIG. 1 equipped to operate in a triple diversity mode. As in the dual diversity earth station 24 the primary site employs a transmitter 44, receiver 46, and antenna 48 to communicate with the satellite repeater 20. A secondary site, located at a distance from the primary site, also consists of a transmitter 50, receiver 52 and antenna 54 and is connected to the primary site by a terrestrial link 56. Triple diversity is provided by a tertiary site also containing an individual transmitter 58, receiver 60, and antenna 62 and also connected to the primary site by a suitable terrestrial link 64. A switch 66 is provided so that the optimum site or sites of the triple diversity earth station 42 may be selected for signal transmission. The switch 66 is controlled by a logic unit which will be described hereinafter. This system also interfaces with terrestrial communication as represented by the transit center 22.

Figure 2:
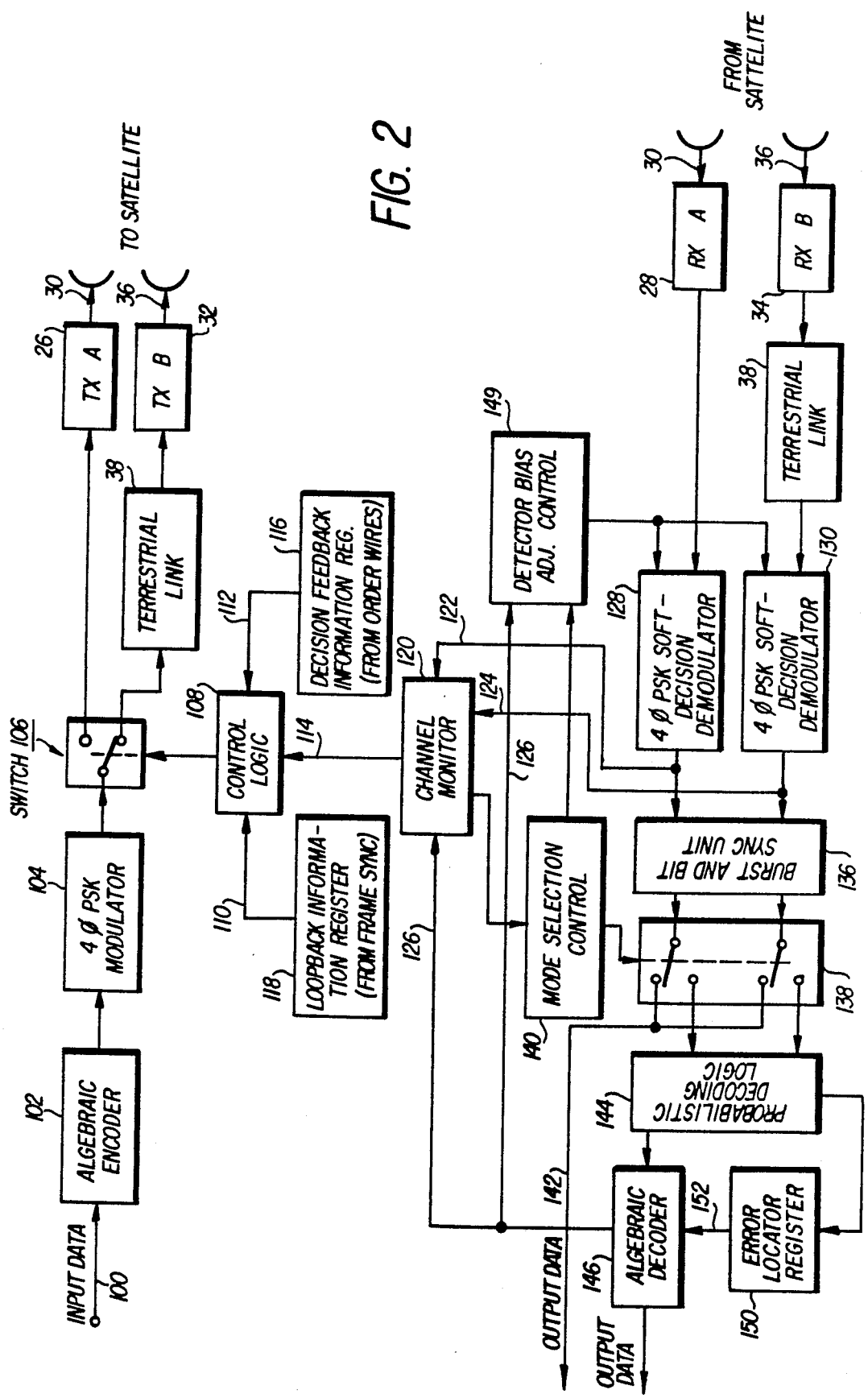
FIG. 2 is the dual diversity system of FIG. 1 shown in greater detail.

Referring now to FIG. 2, the present invention is shown in a dual diversity embodiment. Input data, in the form of a bit stream, is fed on line 100 to an algebraic encoder 102 where the even and odd bits of the bit stream are separately encoded in the conventional manner. It has been found to be desirable to use an efficient systematic code, either convolutional or block, such as the single-parity-check rate 9/10 block code (10, 9), or a cyclic iterative code (10 × 10) or (9 × 9). This systematically encoded bit stream is then fed to a conventional four phase-phase shift keyed (4φ-PSK) burst modulator 104. The present invention permits the modulated burst signal to be sent to the satellite by the primary transmitter 26 located at the control center if no diversity is desired or, if because of attenuation due to local precipitation, it may be sent to the satellite by the remote transmitter 32 located outside the area of gener precipitation. The particular transmitter to be used is connected to the modulator 104 by a switch 106 whose actuation is controlled by a control logic unit 108. This switch 106 corresponds to the switch 40 shown in FIG. 1. The control logic unit 108 performs its control function based upon a predetermined strategy using information supplied on lines 110, 112 and 114. The strategy which is programmed into the control logic unit 108 makes the following decisions: (a) if the attenuation in either up-link is less than a predetermined threshold $T_1$, use the better up-link to transmit; (b) if the attenuation in both up-links is greater than the threshold $T_1$ but less than another predetermined threshold $T_3$, where $T_3$ is greater than $T_1$, and provided that the attenuation is not so great as to prevent initial acquisition and burst synchronization, transmit the bursts alternately from the two sites until the attenuation in one of the two paths becomes less than threshold $T_1$, then resume the strategy in step (a); and (c) if either up-link has an attenuation level greater than $T_3$, then select the link with less attenuation to transmit. However, if the attenuation level of both links exceeds $T_3$ then select any link to transmit, but in that case an up-link outage may be experienced, i.e., transmission may be indefinately interrupted. It is understood of course, that the control logic unit 108 may be built up from conventional discrete logic components such as AND gates, etc., or that a commercial micro-processor may be used to perform the simple logical decisions required by the preceding strategy. Whatever approach is chosen, it is an easy task to make the proper connection to perform the required decisions, and is shown in many textbooks, for example, Professor Ledley's *Digital Computer and Control Engineering*, McGraw Hill, New York, 1960. The alternate transmission of the message burst from the two separated ground sites, as provided for in decision (b) above, also provides an additional important advantage. Specifically, since most stations in a TDMA system are transmitting as well as receiving multidestinational bursts, the earth stations at the destinations can provide monitoring of any up-link fading (attenuation) which may be occuring at the source stations. For example, if a destination receives bursts having small error probabilities from all but a few of its sources, then it may reasonably be assumed that the transmission up-links of these few stations are experiencing substantial attenuation. This up-link status information can be fed back with very high reliability via the order wires in the return paths to these particular transmitting stations. It is possible to utilize the order wires because they are needed to feedback this status information very infrequently since the information rate required to transmit the status information is very low. This feedback information which is used at the transmit stations to monitor the quality of the individual up-links, is stored or collected in a decision feedback information register 116, and periodically fed to the control logic unit 108 via line 112. It is, of course, appreciated that the phrase "order wires" does not really denote actual wires or cables but is merely a vestigial term from the early telephone/telegraph systems. In practice, order wires may be represented by a nontraffic-carrying special portion of the FM baseband, or in a TDMA system, by some special time slots within the frame which are used to send back certain system status information to be used for stationkeeping. In other words, the physical realization of the order wires will depend upon the specific type of communications systems involved. Similarly, it is often the case in a satellite switched TDMA communications system that the frame synchronization signal will be send back or "looped back" to the transmitting station to provide local synchronization monitoring. This loopback information may be stored in a suitable register 118 and then periodically fed via line 110 to the control logic unit 108 for use in making the preceeding strategy decisions. The carrier-to-noise ratio, C/N, of the signal can also be used for monitoring the precipitation attenuation in the up-link. This channel monitoring information may be accumulated in a suitable register 120 and then periodically fed to the control logic unit 108 via line 114. The specific C/N information is obtained via lines 122 and 124 which are connected to the demodulator units which will be described hereinafter. Additional channel monitoring information relating to decoder error probabilities is also available to the channel monitor register 120 on line 126. All of this information on lines 110, 112 and 114 is intended for use by the control logic unit 108 in determining the up-link strategy, i.e., in determining which of the two distance-separated antennas, 30 or 36, will be used to transmit the message to the satellite.

The down-link strategy will now be examined, i.e., how can the two available receivers be best utilized to obtain optimum performance with minimal message error. The signals are received by the two antennas 30 and 36 and fed to the two diversity receivers 28 and 34. After the signals from the distant diversity station have been passed through the appropriate terrestrial link 38, the signals will be detected into the baseband coherently and separately by two four-phase PSK demodulators 128 and 130 using the "soft-decision" technique provided by the present invention. Because the two signals travel paths of different length the output on line 132 from demodulator 128 may not be synchronized with the output on line 134 from demodulator 130. To provide bit-by-bit synchronization of the signals a burst and bit sync unit 136 is provided. The sync unit 136 permits the bursts received from the two different diversity stations to be written in at different times but read out simultaneously, thereby providing bit-by-bit synchronization. The sync unit 136 may be comprised of well-known elastic buffers, sometimes referred to as compression/expansion buffers, which simply store bits until an entire frame is received, then read out the whole frame. Of course, this relatively simple technique for synchronization is only possible because the message is in burst form and the buffer size is sufficiently large to accommodate the anticipated delay between the two received signals caused by the different path lengths. The synchronized signals are then fed to a switch unit 138 which is controlled by a mode selection control unit 140 described below. Under certain conditions the switch unit 138 can cause the received and demodulated signals to be placed on line 142 and directly fed to the appropriate connection. Switch unit 138 can also be actuated under normal conditions to cause the synchronized bit streams to be fed to a probabilistic decoding logic unit 144. This decoding unit 144 operates according to a specialized algorithum provided by the invention and described below. The decoded signal on line 146 is fed from the probabilistic decoder 144 to an algebraic decoder 146 of the conventional type which acts as an error detector by performing conventional parity checking. Upon determining that parity exists the desired message sequence is transmitted on line 148. The decoder error probability information on line 126 from the alegebraic decoder 146 is also fed to a detector bias adjust unit 149 which serves to set the demodulation levels of the demodulators 128 and 130.

The operation of the four-phase PSK soft-decision demodulators 128 and 130 is explained by use of FIGS. 3 and 4. FIG. 3 shows the boundaries used in a conventional hard-decision 4φ-CPSK demodulator. The operation of such hard-decision demodulator is so well-known that further explanation is unnecessary, except to say that each boundary 202, 204 corresponds to a binary detector with a certain preset bias. The soft-decision demodulator 128 or 130 used in the present invention uses the same two boundaries 202 and 204 but in addition adds two extra boundaries to both the in-phase and quadrature components, this is shown in FIG. 4. Again, each boundary corresponds to a binary detector with a certain bias. The six decision boundaries, 202, 204, 206, 208, 210, and 212, can easily be positioned by adjusting the biases of the six detectors under the control of the detector bias adjust unit 149. The signal same at the demodulators, 128 or 130, will then fall into one of sixteen decision regions as defined by the six boundaries. Each of these regions is uniquely associated with a 4-bit symbol (word) in the soft-decision demodulator of FIG. 4, as contracted with the more conventional four-phase PSK hard-decision demodulator of FIG. 3 in which there are only four decision regions each associated with a 2-bit symbol. Therefore, weakly received signal samples which are most likely to fall into the shaded regions of FIG. 4, are not given a 0 or 1, right or wrong, hard decision, instead a soft-decision is given to more closely indicate the actual position of the sample in the shaded region. As discussed above, if the carrier to noise ratio, C/N, of one or both of the receivers (28 or 34 of FIG. 2) remains above a predetermined threshold level T, then the output of the channel with the higher C/N will be chosen for use until both channels drop below T. In other words, the demodulators will only use the outputs of the two detectors corresponding to boundaries 202 and 204, and the outputs of the other four detectors corresponding to boundaries 206, 208, 210, 212 and 214, will not be used. If this is not the case and neither receiver's signal is above the threshold, after the bit-by-bit synchronization is performed by the expansion and compression buffers of the burst and bit sync unit 136, 2-bit symbols will be generated by the probabalistic decoding logic 144 of FIG. 2 from the 4-bit symbol pairs produced by the soft-decision demodulators 128 and 130. This 4-bit to 2-bit conversion is done according to a maximum-likelihood (ML) rule for 4-bit symbols from both links which is shown tabulated in FIG. 5. It will be noticed from FIG. 5, that although there are three types of symbols, 0, 1, and $x$, the pairs 00, 01, 10, 0x, 0x, and x1 are still considered 2-bit symbols because the symbol "$x$" is either a 0 or a 1 as determined by the algebraic decoder 146. FIG. 5 then is a table showing the rules followed by the probabalistic decoder 144 for transforming from the 4-bit symbols of the two diversity links to more readily usable 2-bit symbols, wherein the vertical and horizontal coordiantes are the received 4-bit symbols from the two links. The $x$ entries in the table of FIG. 5 represent cases in which the maximum likelihood rule would result in very uncertain decisions because of unacceptable error rates. Therefore, they are in effect erased and an "$x$" is substituted to indicate that a potential error has been detected. When this occurs the error location is recorded in an error location register, 150 of FIG. 2, whose output signal on line 152 serves to remind the algebraic decoder 146 of the location of the error. For example, if the 2-bit symbol 00 corresponding to the angle $\pi/4$ has been sent and the received signal samples at the two diversity sites fall in the soft-decision regions represented by 0001 and 1000 respectively, then it is more likely that 00 has been sent. Hence, by the use of the table in FIG. 5 the probabalistic decoding logic 144 chooses the 2-bit symbol 00. On the other hand, if 0001 and 0100 are received from the two links, it is of equal probability that either 00 or 01 has been sent. Although it is obvious that the first bit of the transmitted 2-bit symbol is 0, the second bit is very uncertain. Therefore, it is "erased" and replaced by an x.

Figure 6:
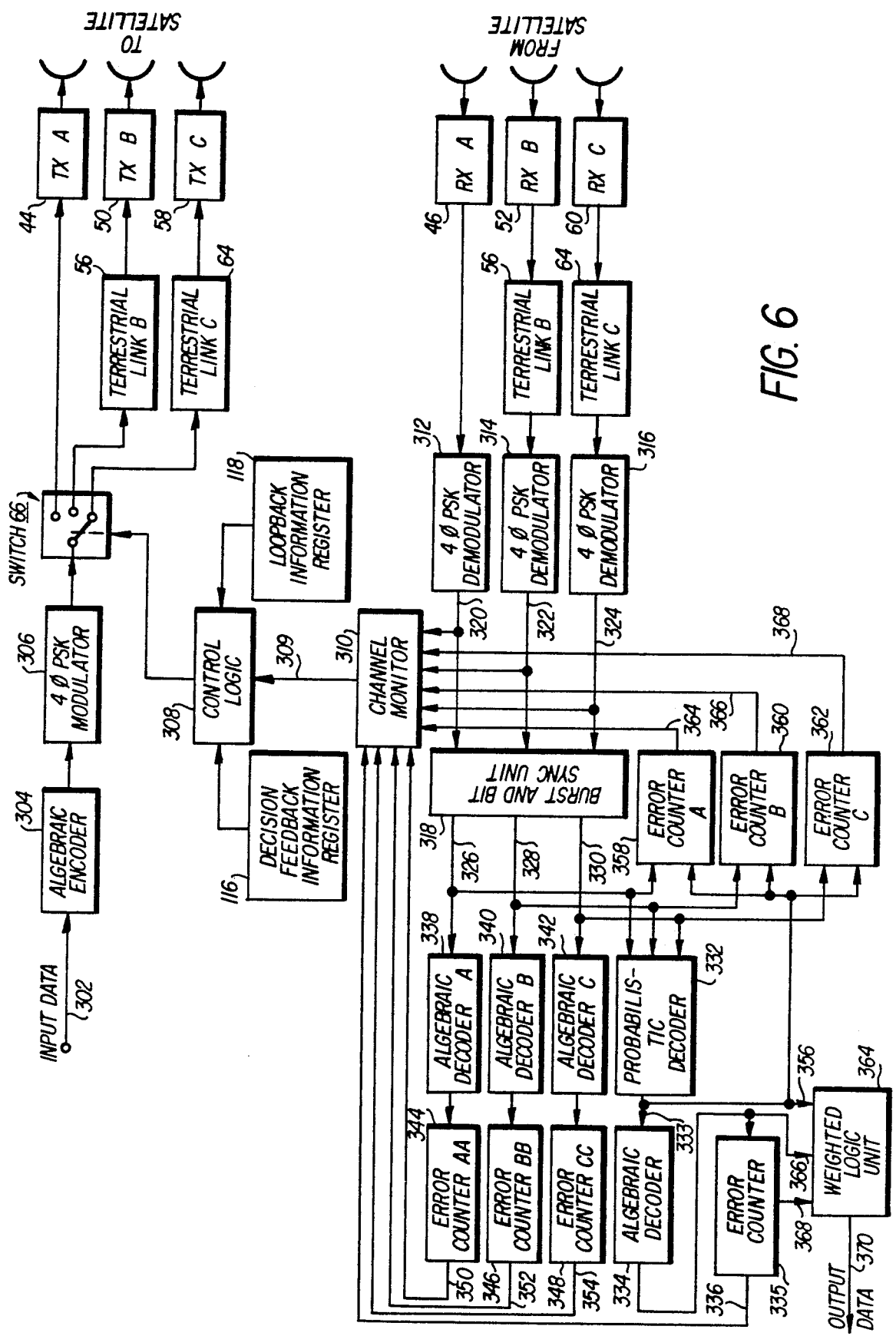
FIG. 6 is the triple diversity system of FIG. 1 shown in greater detail in block diagram form.

Referring now to FIG. 6 the triple diversity embodiment, 42 of FIG. 1, of the present invention is shown in greater detail. The input data bit stream is fed on line 302 to a conventional algebraic encoder 304 where the even and odd bits are separately encoded. This encoded bit stream is then fed to a conventional four phase-phase shift keyed (4φ-PSK) modulator 306. As explained above, any of the three separate transmitting sites may be used to transmit the mesage, and the site to be used is selected by a suitable switch 66. This switch 66 is controlled by a control logic unit 308. The control logic unit 308 may be kept as simple as possible and may consist only of comparators and conventional decision logic circuits arranged to accept input data and produce an output based on certain decisions which have been designed into the logic unit. The input data upon which the control logic unit 308 must operate is the same as in the dual diversity case of FIG. 2, specifically, the carrier to noise ratio (C/N) information from the received signals on line 309, the loopback information 118 from the frame sync, and the decision feedback information 116 from the destination stations. This information is then used by the control logic unit 308 to evaluate the three available uplink stations according to the following rules. Because it is a simple matter for the control logic unit 308 to select the up-link with the least attenuation, based upon the available information, this then is the first rule or decision to be enforced by the control logic 308, i.e. select the best (least attenuated) of the three staions. However, if the best link has an attenuation greater than a predetermined threshold, $T_2$, then the other two links will be compared. If the attenuation of the other two is clearly greater then it is a simple matter for the control logic 308 to choose the best link. If the attenuation of the other two is not clearly much greater, then the bursts are transmitted alternately between the better two or among all three. When any link becomes better than this threshold $T_2$, this link will be chosen by the control logic 308 and switch 66 will be actuated to transmit bursts over this link. It is seen then that the up-link strategy for the triple diversity case of FIG. 6 is exactly the same as for the dual diversity case of FIG. 2, with the exception of the additional station. Turning now to the down-link strategy, the received signals from the three separated diversity sites are coherently and separately detected into the baseband by three distinct hard-decision demodulatores 312, 314 and 316. The hard-decision boundaries of these demodulators are shown in FIG. 3. As explained above, the three demodulated baseband bursts can be synchronized bit-by-bit with conventional compression and expansion buffers contained in a burst and bit sync unit 318. The output from each demodulator also contains C/N information which may be fed to the channel monitor unit 310 on lines 320, 322, and 324. The output signals from the sync unit 318 are fed on lines 326, 328 and 330 to a probabalistic decoder 332, which operates according to majority logic. That is, the resultant output bit from the sync unit 318 is chosen to be the same as the majority of the three bits at the same location in these three bursts. For example, if the instantaneous values at some instant $i$ on lines 326, 328 and 300 are (1,0,1), then 1 is assumed to be the bit was transmitted since 1 is more probable than 0, i.e., it is in the majority.

The resultant burst from the probabalistic decoder 332 is fed on line 333 to a conventional algebraic decoder 334 for error detection/correction. The algebraically signal is fed to an error counter 335 which counts the error events and feeds this information back to the channel monitor 310 on line 336. Each burst from the three separate links on lines 326, 328 and 330, is also sent to individual algebraic decoders 338, 340, and 342 of the conventional type. Each burst is then decoded in its associated algebraic decoder and the number of detected errors or corrected errors are counted in an associated error counter 344, 346, or 348. The results of the error counters are sent back on lines 350, 352, and 354 to the channel monitor unit 310 to be used in determining the most reliable terminal. Similar error monitoring is provided by using the output of the probabalistic decoder 332 on line 356 and feeding it to a second set of error counters 358, 360 and 362. Each individual burst, already available on lines 326, 328 and 330 is also fed to its associated error counter to be compared with the probabalistically decoded burst on line 356. For example, if (0111000), (0100111), and (0010110) are the received bursts now on lines 326, 328 and 330, then the resultant bursts on line 334 will be (0110110) and the number of disagreements between the resultant burst and the received bursts from the three links will be 3, 2, and 1, respectively. Therefore, the signal quality at receiver 46 is worse than at 52 or 60. This error count is then tracked for each link by feeding the information on lines 364, 366 and 368 to the channel monitor unit 310. The finally decoded signal from the algebraic decoder 334 is then fed to a weighted logic unit 364 on line 366 where it is weighted in the conventional manner by the contents of the error counter 335 on line 368 and the output of the probabalistic decoder 332 on line 356. The output data is then produced on line 370.

Figure 7:
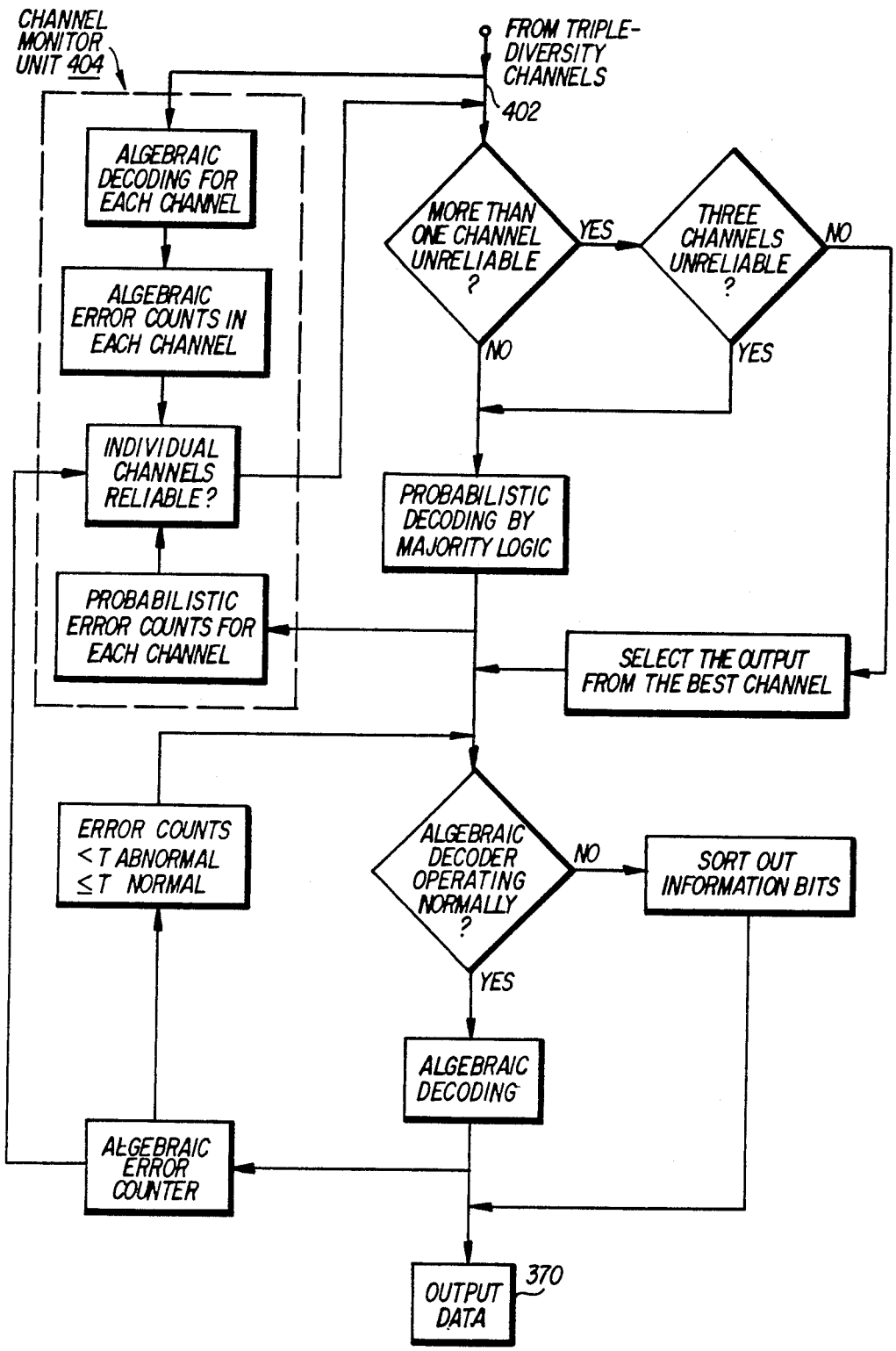
FIG. 7 is a simplified error control algorithm for use by the triple diversity system of FIG. 6.

Turning now to FIG. 7, an algorithm of the decision processes utilized in the triple diversity system of FIG. 6 is shown. The input information is shown for reasons of simplicity on a single line 402, although actually this is three parallel information channels, corresponding to the inputs of the three demodulators 312, 314 and 316 of FIG. 6. The logical functions performed by the channel monitor unit 310 of FIG. 6 are shown enclosed in the dashed line 404. Because each logical step is explained by the notations whithin the block it is not necessary to present a detailed functional description of this algorithm.

It is understood that the details of the foregoing embodiment are set forth by way of example only. Various types of switches and logic controls may be used to select the most advantageous transmit/receive station. Accordingly, it is contemplated that this invention not be limited by the particular details of the embodiment as shown except as defined in the appended claims.

What is claimed is:

1. In a TDMA satellite communications system employing a plurality of earth stations separated by a substantial distance one from another, each earth station having a transmitter and a receiver, the improvement comprising:

means for selecting one of said transmitters to transmit an encoded modulated burst of information to said satellite, a plurality of demodulator means each connected to a corresponding one of said receivers for demodulating the message bursts received from the satellite according to a plurality of preselected thresholds and for producing demodulated output signals, probabalistic decoding means connected to receive said demodulated output signals for producing decoded output signals and providing for error correction according to the probability of maximum likelihood of occurrance of said demodulated output signals, and parity check means adapted to receive the decoded output signals from said probablistic decoding means for performing a parity check on said decoded output signals and for producing a single output signal representing the message transmitted by said selected transmitter.

2. The apparatus as claimed in claim 1 wherein said selecting means comprises:

means for determining whether the attenuation of any transmission path is less than a preselected threshold $T_1$, for selecting the transmitter to transmit the signal to the satellite whose path attenuation is less than $T_1$, for determining whether the attenuation of any transmission path is greater than $T_1$ but less than a second preselected threshold $T_2$ which is greater than $T_1$, and for selecting alternate transmitters to transmit the signal to the satellite.

3. The apparatus of claim 2 further comprising:

loopback information register means connected to said receivers for deriving path attenuation information from the frame synchronization portion of the received signals and connected to said means for selecting, said information for use in determining whether any path attenuation is less than $T_3$ and greater than $T_1$, and decision feedback information register means connected to said receivers for deriving path attenuation information from the order wire portion of the received signals and connected to said means for selecting, said information for use in determining whether any path attenuation is less than $T_3$ and greater than $T_1$.

4. The apparatus of claim 1 further comprising synchronization means connected to receive said demodulated output signals for synchronizing the received demodulated signals one to another and producing synchronized output signals fed to said probabalistic decoding means.

5. The apparatus of claim 4 wherein said synchronization means includes a plurality of compression/expansion buffers to buffer said received demodulated output signals.

6. The apparatus of claim 1 wherein each of said plurality of demodulator means comprises six variable bias detector means forming six distinct boundary levels for producing four-bit digital words indicating the position of the received signals relative to said boundaries.

7. A satellite communication system comprising:

a plurality of earth stations spaced apart one from another and each having a transmitter and a receiver for transmitting and receiving to and from the satellite coded burst modulated message signals;

switch means connected to receive said message signals for selectively enabling only one of said transmitters at a time;

control means connected to said receivers for actuating said switch means;

demodulator means connected to each receiver for demodulating each received message signal into an output signal composed of binary words of a first number of bits;

means connected to receive each output signal from said demodulator means for comparing the corresponding words in each signal one to another and producing output signals composed of binary words of a second number of bits wherein each bit is produced according to the probability of the maximum likelihood of occurrence of each bit; and decoder means connected to receive said output signals composed of said binary words of said second number of bits for parity checking said words and producing a single output signal representing the message transmitted by said enabled transmitter to the satellite.

8. The apparatus of claim 7 wherein said control means comprises the steps of:

means for determining if the signal attenuation in any transmission path to and from the satellite is less than a preselected amount $T_1$;

for selecting to be enabled the transmitter whose transmission path attenuation is less than $T_1$;

for determining if the signal attenuation of any transmission path to and from the satellite lies between the limits of $T_1$ and a second predetermined amount $T_2$ greater than $T_1$; and for selectively enabling alternate transmitters to transmit to said satellite if the signal attenuation falls between $T_1$ and $T_2$.

9. The apparatus of claim 8 further comprising burst synchronization means connected to receive said demodulation output signals composed of binary words for synchronizing with each other the corresponding words in each output signal and producing synchronized output signals therefrom.

10. The apparatus of claim 9 wherein said demodulator means are comprised of a plurality of variable bias threshold detectors having said bias threshold levels set to form a plurality of predetermined boundary regions defined by four bit binary words.

11. The apparatus of claim 10 further comprising:

loopback register means connected to said receiver for producing first path attenuation level output signals connected to said control means, said output signals being derived from the burst synchronization information of the received signals; and feedback register means connected to said receivers for producing second path attenuation output signals also being connected to said control means, said second path attenuation signals being derived from the order wire segment of the received signals.

12. In a TDMA satellite communications system employing a plurality of earth stations each containing an transmitter and receiver, the improvement comprising:

switch means for connecting only one transmitter to an encoded modulated burst of information for transmitting said information via said satellite to said earth stations;

control means connected to the outputs of said receivers for actuating said switch means in accordance with a predetermined algorithm;

a plurality of four phase demodulator means one connected to the output of each receiver for demodulating each received signal into a demodulated signal comprised of binary words;

synchronizing means connected to receive each demodulated signal for synchronizing the corresponding words in each demodulated signal to each other and producing parallel synchronized output signals therefrom;

decoder means connected to receive said parallel synchronized output signals for detecting the corresponding bits in each binary word and producing a output signal composed of binary words wherein each bit value represents the majority of the bits detected; and means for performing parity check on said output signal from said decoder means and producing an output signal representing said encoded modulated burst of information.

* * * * *